United States Patent
Yost et al.

(10) Patent No.: US 7,702,232 B2
(45) Date of Patent: Apr. 20, 2010

(54) DYNAMIC FOCUS ZONES FOR CAMERAS

(75) Inventors: Jason Yost, Ft. Collins, CO (US); Daniel Bloom, Ft. Collins, CO (US); Gregory Hofer, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 662 days.

(21) Appl. No.: 11/492,410

(22) Filed: Jul. 25, 2006

(65) Prior Publication Data

US 2008/0025716 A1    Jan. 31, 2008

(51) Int. Cl.
*G03B 3/10* (2006.01)
(52) U.S. Cl. .................. 396/123; 396/121; 348/345
(58) Field of Classification Search .................. 396/123, 396/121

See application file for complete search history.

(56) References Cited

U.S. PATENT DOCUMENTS

| | | | |
|---|---|---|---|
| 4,300,823 A | | 11/1981 | Yamanaka et al. |
| 4,422,097 A | | 12/1983 | Inuiya |
| 4,629,324 A | * | 12/1986 | Stern .......................... 356/609 |
| 5,003,339 A | * | 3/1991 | Kikuchi et al. .............. 396/100 |
| 5,150,217 A | | 9/1992 | Senuma et al. |
| 5,258,801 A | * | 11/1993 | Kusaka et al. .............. 396/123 |
| 5,900,927 A | * | 5/1999 | Hasegawa ................. 356/3.13 |
| 6,081,668 A | * | 6/2000 | Furuyama et al. ............. 396/55 |
| 6,112,029 A | * | 8/2000 | Suda ........................... 396/92 |
| 6,275,658 B1 | | 8/2001 | Zander |
| 6,463,214 B1 | * | 10/2002 | Nakata ........................ 396/104 |
| 6,512,549 B1 | * | 1/2003 | Iijima et al. ................. 348/349 |
| 6,747,808 B2 | | 6/2004 | Voss et al. |
| 6,847,402 B2 | * | 1/2005 | Sugimoto et al. ........... 348/354 |
| 6,970,646 B2 | | 11/2005 | Hirai |
| 7,095,434 B1 | * | 8/2006 | Ikeda ...................... 348/219.1 |
| 2002/0021897 A1 | | 2/2002 | Nakata |
| 2002/0097324 A1 | * | 7/2002 | Onuki ........................ 348/208 |
| 2003/0108346 A1 | * | 6/2003 | Yoshida et al. .............. 396/123 |
| 2006/0256229 A1 | * | 11/2006 | Wernersson ................ 348/348 |
| 2006/0269125 A1 | * | 11/2006 | Kalevo et al. ............... 382/162 |
| 2007/0104475 A1 | * | 5/2007 | Cheng ........................ 396/234 |
| 2008/0106637 A1 | * | 5/2008 | Nakao et al. ................ 348/371 |

FOREIGN PATENT DOCUMENTS

| | | |
|---|---|---|
| JP | 63094213 | 4/1988 |
| JP | 07110440 | 4/1995 |
| JP | 2002182106 | 6/2002 |
| JP | 2003125274 | 4/2003 |
| JP | 2004317795 | 11/2004 |

* cited by examiner

*Primary Examiner*—Melissa J Koval
*Assistant Examiner*—Warren K Fenwick

(57) ABSTRACT

Systems and methods of implementing dynamic focus zones for cameras are disclosed. In an exemplary implementation, a method may include selecting a reference image from a scene being photographed. The method may also include selecting a plurality of difference images from regions adjacent the reference image. The method may also include comparing the reference image and the plurality of different images. The method may also include selecting a plurality of distinct focus zones based on correlation of the compared reference image and the plurality of difference images.

22 Claims, 7 Drawing Sheets

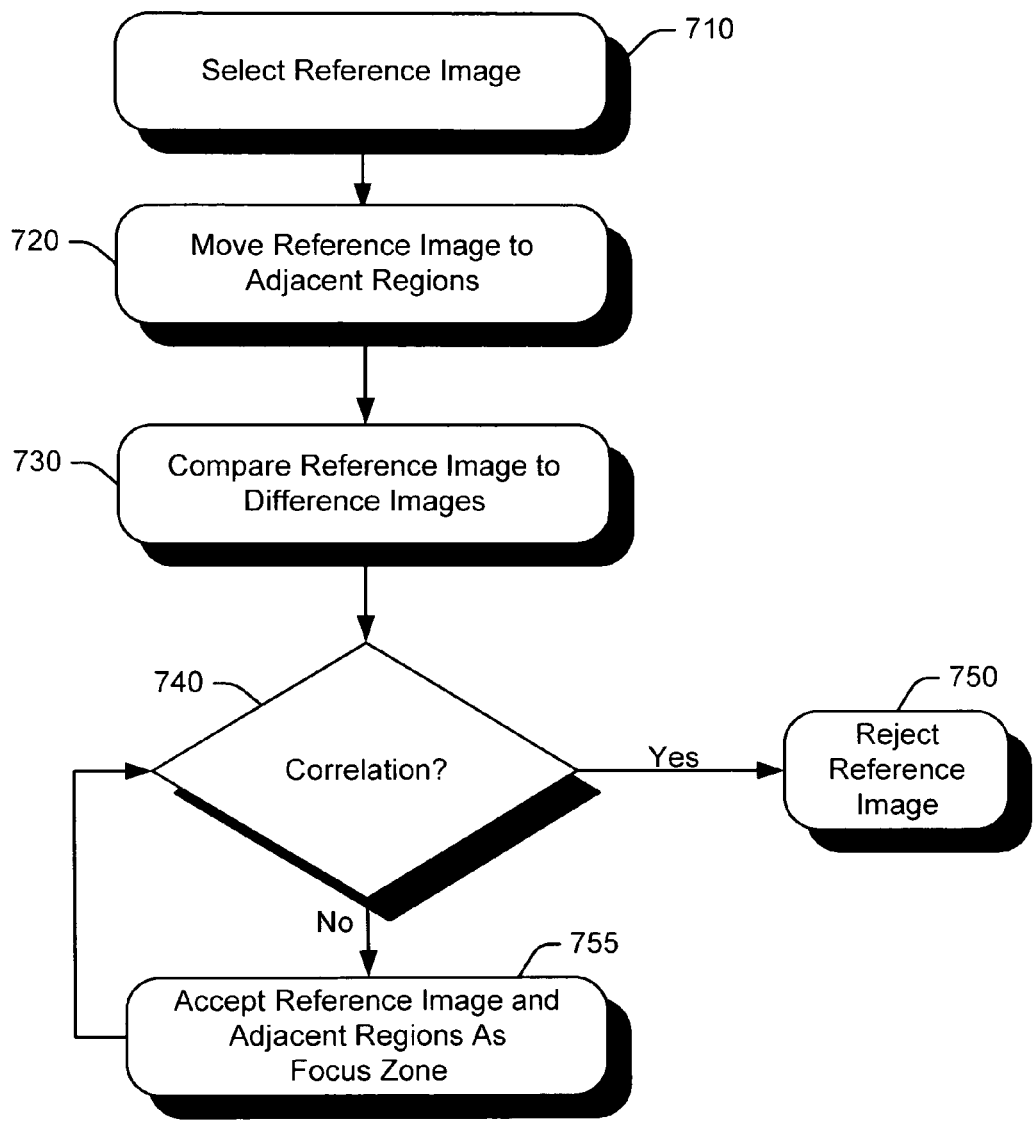

DYNAMIC FOCUS ZONES FOR CAMERAS

BACKGROUND

Cameras with auto-focus use a highly-structured object (or target) in the scene being photographed for the auto-focus operations. The position of the focus lens (or focal length) is adjusted to maximize contrast of the target, which indicates that the object is in focus. Although a skilled photographer may understand this concept and ensure that a suitable target is positioned in the focus zone for focusing the camera, the typical camera user simply wants to "point-and-shoot" to take photos.

In point-and-shoot photography, there may not be any suitable targets in the focus zone, resulting in a poorly focused photo. Some cameras use multiple, fixed focus zones to increase the probability of a suitable target being in at least one of the focus zones. However, there still may not be any suitable targets in any of the fixed focus zones, or there may be better targets that are not in any of the fixed focus zones.

Other options are also available, such as using range finders (non-TTL focus modules) to focus the camera lens. However, range finders provide limited control over the focus region, require calibration to match the lens, and increase the cost of the camera. Accordingly, the use of range finders is not practical or cost-effective for most consumer cameras.

BRIEF DESCRIPTION OF THE DRAWINGS

FIG. 7 is a flowchart illustrating exemplary operations which may be implemented for qualifying dynamic focus zones for cameras.

DETAILED DESCRIPTION

Systems and methods are disclosed herein to implement dynamic focus zones for cameras. In an exemplary embodiment, firmware may be provided for analyzing a scene being photographed to find suitable targets in the scene for auto-focus operations using any one or more metrics, such as, e.g., contrast ratio, brightness number/frequency of edges, and gradient. The focus zones are dynamically generated over these targets for auto-focus operations. Optionally, different number/size/shape focus zones may be selected. Also optionally, various filters may be applied, e.g., to qualify regions of the scene that are too dark/light for auto-focus operations.

In exemplary embodiments, the systems and methods implement multiple focus zones (and therefore may use a larger sensor area) for increasing focus accuracy. The focus zones may be identified, sorted, selected for different focus metrics, and rejected (e.g., based on exposure level, saturation, and image structure).

In still other exemplary embodiments, the systems and methods identify focus zones using an auto-correlation algorithm. Such embodiments are not as readily affected by noise and tend to select targets that work well for most metrics and object tracking algorithms, making implementation more robust for consumer cameras.

Figure 1:
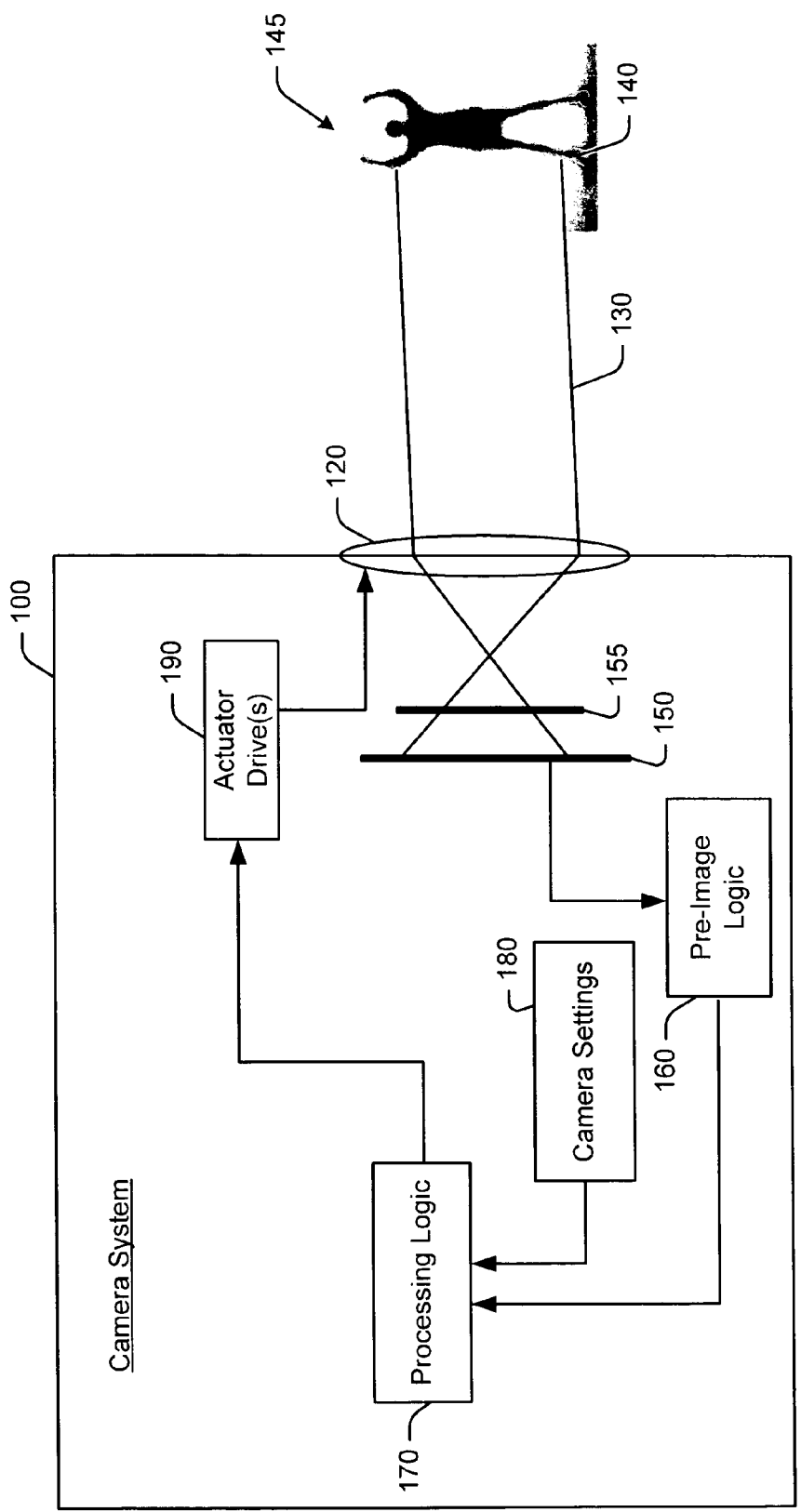
FIG. 1 is a block diagram of an exemplary camera system which may implement dynamic focus zones.

FIG. 1 is a block diagram of an exemplary camera system 100 which may implement dynamic focus zones. The exemplary camera system 100 may be a still-photo and/or video camera, now known or that may be later developed.

Exemplary camera system 100 may include a lens 120 positioned to focus light 130 reflected from one or more objects 140 in a scene 145 onto an image sensor 150 when a shutter 155 is open (e.g., for image exposure). It is noted that a separate image sensor (not shown) may also be provide, e.g., for focus operations. Exemplary lens 120 may be any suitable lens which focuses light 130 reflected from the scene 145 onto image sensor 150.

Exemplary image sensor 150 may be implemented as a plurality of photosensitive cells, each of which builds-up or accumulates an electrical charge in response to exposure to light. The accumulated electrical charge for any given pixel is proportional to the intensity and duration of the light exposure. Exemplary image sensor 150 may include, but is not limited to, a charge-coupled device (CCD), or a complementary metal oxide semiconductor (CMOS) sensor.

Camera system 100 may also include pre-image logic 160. In digital cameras, the pre-image logic 160 receives electrical signals from the image sensor 150 representative of the light 130 captured by the image sensor 150 during exposure to generate a digital pre-image of the scene 145.

Using a pre-image enables the camera system to perform various processes (e.g., auto-exposure, auto-focus, image stabilizing, detecting white balance, etc.). The pre-image(s) may be one or more of the pre-images already being implemented by the camera for focusing, auto-exposure, pre-flash calculations, and/or the pre-image(s) may be obtained specifically for displaying to the user.

Camera system 100 may also include processing logic 170. Processing logic 170 may receive the pre-image data from pre-image logic 160 and perform various calculations or processes on the pre-image (or "frame data"). Exemplary processing logic 170 may implement processes for auto-focus operations using target selection and dynamic focus zones that are described in more detail below.

Processing logic 170 may receive input from other sources in addition to the pre-image logic 160. For example, camera settings data 180 may also be provided as input to the processing logic 170. Output from the processing logic 170 may be used by one or more other program code modules in the processing logic 170 and/or by system devices (e.g., actuator drives 190 for moving the lens 120 during auto-focus operations).

Before continuing, it is noted that shutters, image sensors, and other devices, such as those illustrated in FIG. 1 and others not shown but that are common to cameras, are well-understood in the camera and photography arts. These components may be readily provided for camera system 100 by those having ordinary skill in the art after becoming familiar with the teachings herein, and therefore further description is not necessary.

It is also noted that the camera system 100 shown and described above with reference to FIG. 1 is merely exemplary of a camera system which may implement dynamic focus zones. The systems and methods described herein are not intended to be limited only to use with the camera system 100. Other embodiments of camera systems which may implement dynamic focus zones are also contemplated.

Figure 2A:
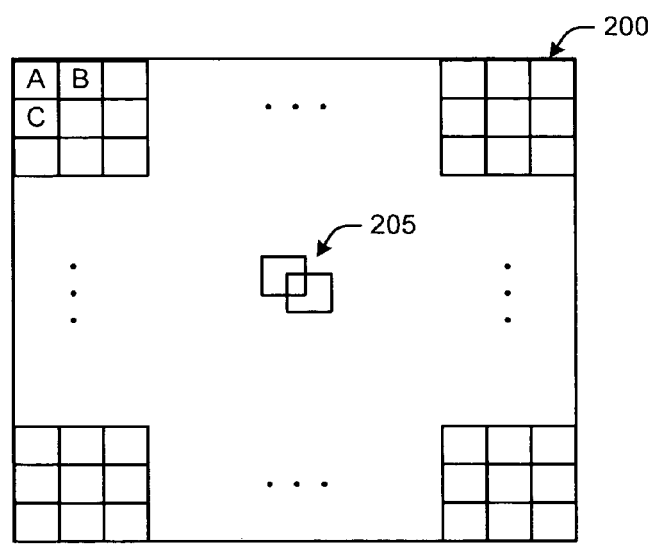
FIGS. 2a and 2b illustrate exemplary selection of dynamic focus zones, wherein (a) is a high-level illustration of exemplary grid elements which may be implemented, and (b) are exemplary histograms which may be implemented.
Figure 2B:
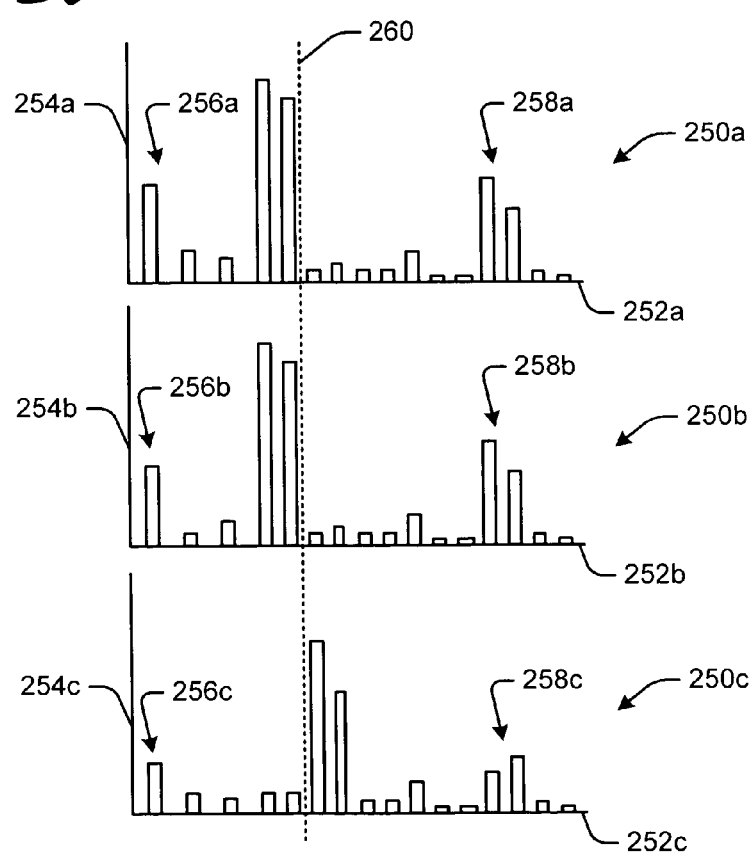

FIGS. 2a and 2b illustrate exemplary selection of dynamic focus zones, wherein (a) is a high-level illustration of exemplary grid elements 200 which may be implemented, and (b) are exemplary histograms 250a-c which may be implemented. In an exemplary embodiment, the grid elements 200 may represent individual pixels on the image capture device (e.g., image sensor 150 in FIG. 1). In another exemplary embodiment, the grid elements 200 may represent groups of pixels (e.g., for analyzing the scene faster than a pixel-by-pixel basis). In still another exemplary embodiment, the grid elements 200 may represent overlapping pixels (e.g., as illustrated by overlapping grid elements 205 in FIG. 2a). The specific implementation may depend on design considerations, such as but not limited to, processing speed, desired granularity, cost, etc.

The grid elements 200 may be analyzed to identify targets in a scene being photographed which may be suitable for focusing operations. In an exemplary embodiment, pixel data may be provided (e.g., by the pre-image logic 160 in FIG. 1) for adjacent grid elements 200. The pixel data for adjacent grid elements 200 may be compared to identify the targets (e.g., by processing logic 170 in FIG. 1). For example, adjacent grid elements 200 that exhibit different brightness levels may indicate a highly structured region in the scene being photographed, and hence a suitable target for auto-focus operations.

In general, areas of high contrast are identified by summing the absolute differences of mean histogram values between adjacent grid elements. The highest contrast exists around the grid element with the largest sum and a focus zone may then be selected to include these grid elements. If a plurality of grid elements in a local region all have a large contrast sum, then these grid elements may be combined into a single target zone.

Although carried out in program code (e.g., processing logic 170 in FIG. 1), this comparison may be observed visually by comparing the histograms 250a-c. Histograms 250a-c may be generated using the pixel data (e.g., brightness levels) for adjacent grid elements 200. In this example, histogram 250a corresponds to pixel data for the grid element designated A in FIG. 2a, histogram 250b corresponds to pixel data for the grid element designated B in FIG. 2a, and histogram 250c corresponds to pixel data for the grid element designated C in FIG. 2a. The X-axes 252a-c represent the brightness values (e.g., increasing values shown from left to right) and the Y-axes 254a-c represent the number of pixels in each grid element exhibiting those brightness values.

As illustrated by the line 260 through histograms 250a-c, it is observed that grid elements A and B have substantially the same brightness values, and therefore likely do not represent much structure. However, grid elements A and C have different brightness values (high contrast), indicating that there may be greater structure between grid elements A and C. Accordingly, positioning a focus zone over grid elements A and C is likely to provide a suitable target for auto-focus operations.

Other embodiments for identifying targets in the scene being photographed are also known and/or may be later developed and may be implemented with the teachings herein. For example, a figure of merit for each grid element may be computed, and the grid elements having the highest figure of merit may be used to select focus zones. Still other embodiments are shown and described, for example, in co-owned U.S. Pat. No. 6,747,808. It is noted, however, that any suitable criteria for differentiating adjacent grid elements 200 may be implemented to identify targets in the scene being photographed.

In addition, one or more filters may also be implemented for selecting focus zones (or rejecting focus zones that have already been selected). In one example, a saturation filter may be implemented for areas of the image that contain large numbers of saturated pixels. The saturation filter may be implemented to either exclude these pixels from any of the focus zones, or alternatively, to combine these pixels into a single target zone (e.g., for night vision). In another example, an exposure filter may be implemented to exclude regions in an image from the focus zones that are either too bright or too dark for auto-focus operations (e.g., noise 256a-c, 258a-c in the histograms 250a-c).

Figure 3A:
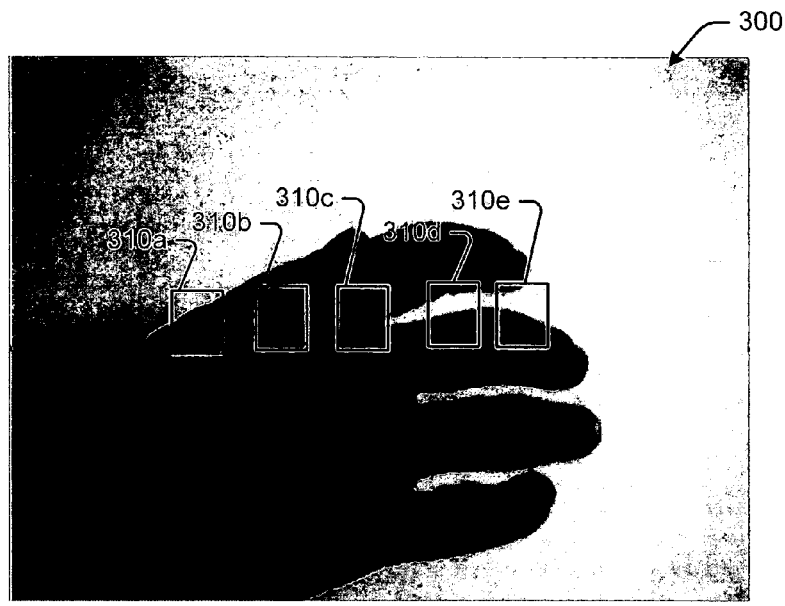
FIGS. 3a-3b illustrate auto-focus operations using a first set of exemplary focus zones, wherein (a) is a digital image showing the focus zones selected in a scene being photographed, and (b) is a plot for determining lens position during auto-focus operations using the selected focus zones.
Figure 3B:
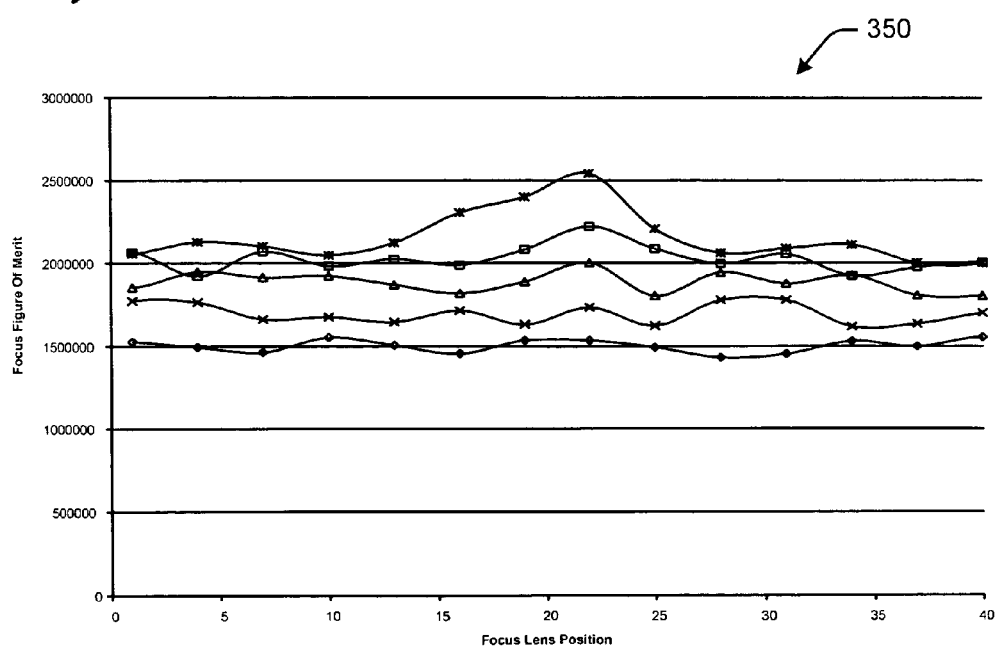

FIGS. 3a-3b illustrate auto-focus operations using a first set of exemplary focus zones, wherein (a) is a digital image 300 showing the focus zones 310a-e selected in a scene being photographed, and (b) is a plot 350 for determining lens position during auto-focus operations using the selected focus zones. Each line of plotted data corresponds to one of the focus zones 310a-e and larger focus of Figure of Merit (FOM) values indicate better focus sharpness.

In this example, the focus zones 310a-e are positioned substantially in the center of the scene being photographed. It is observed from FIG. 3a that there is little variation within any of the focus zones, and hence there is no suitable target for the auto-focus operations. This is further illustrated by the plot 350 which shows little variation in the figure of merit (FOM) for different positions of the focus lens.

Figure 4A:
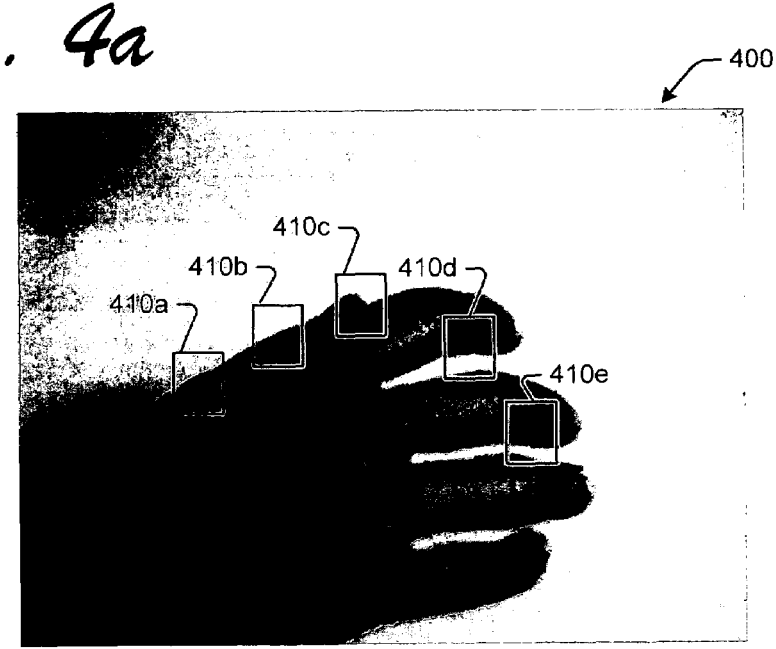
FIGS. 4a-4b illustrate auto-focus operations using a second set of exemplary focus zones, wherein (a) is a digital image showing the focus zones selected in a scene being photographed, and (b) is a plot for determining lens position during auto-focus operations using the selected focus zones.
Figure 4B:
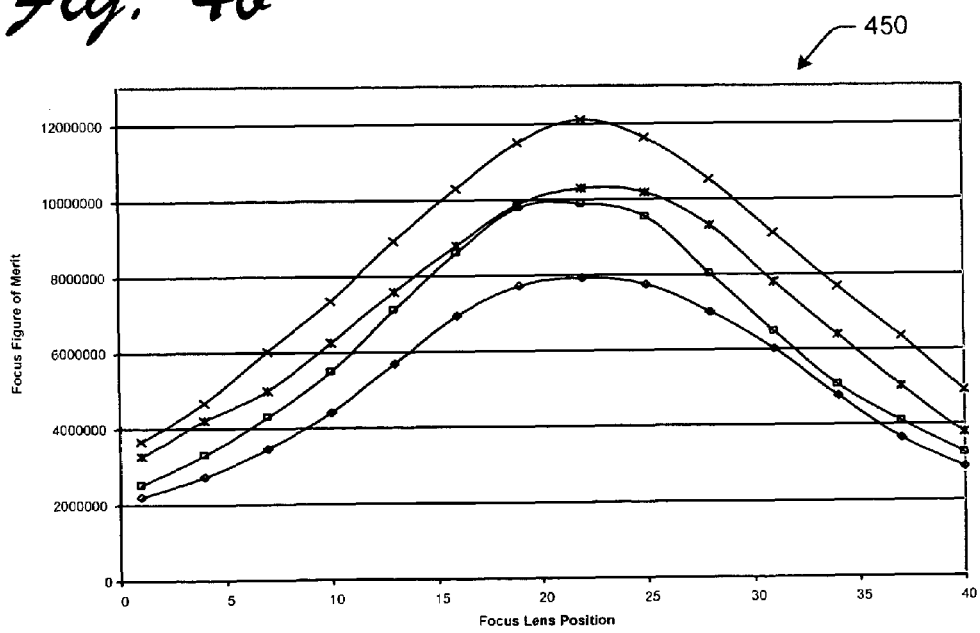

FIGS. 4a-4b illustrate auto-focus operations using a second set of exemplary focus zones, wherein (a) is a digital image 400 showing the focus zones 410a-e selected in a scene being photographed, and (b) is a plot 450 for determining lens position during auto-focus operations using the selected focus zones.

In this example, dynamic focus zones 410a-e were determined, e.g., by comparing adjacent grid elements to identify suitable targets for auto-focus operations as described above with reference to FIGS. 2a-b. Accordingly, the focus zones 410a-e are positioned substantially along the edge of the hand being photographed so that each of the focus zones includes an area of high-structure (i.e., a suitable target). This is further illustrated by the plot 450 which shows a better figure of merit (FOM) as the position of the focus lens is adjusted (indicating the scene is in focus). The higher image content in each of the focus zones effectively yields a better signal to noise ratio for the auto-focus operations and improves the likelihood of finding an optimum focus lens position.

It is noted that the focus zones 410a-e shown in FIGS. 4a-b are rectangular in shape and substantially the same size as one another. In addition, five focus zones were selected for this example. However, the focus zones are not limited as such. In other embodiments, the focus zones may be any size and/or shape. For example, the focus zones may be dynamic in nature (i.e., fitted to match a region of high structure). In addition, any number of focus zones may be implemented. The use of focus zones may depend at least to some extent on design considerations, such as but not limited to, processing speed and the desired granularity for the auto-focus operations. For example, the selection of more focus zones may take longer but provide better targets for auto-focus operations.

Figure 5A:
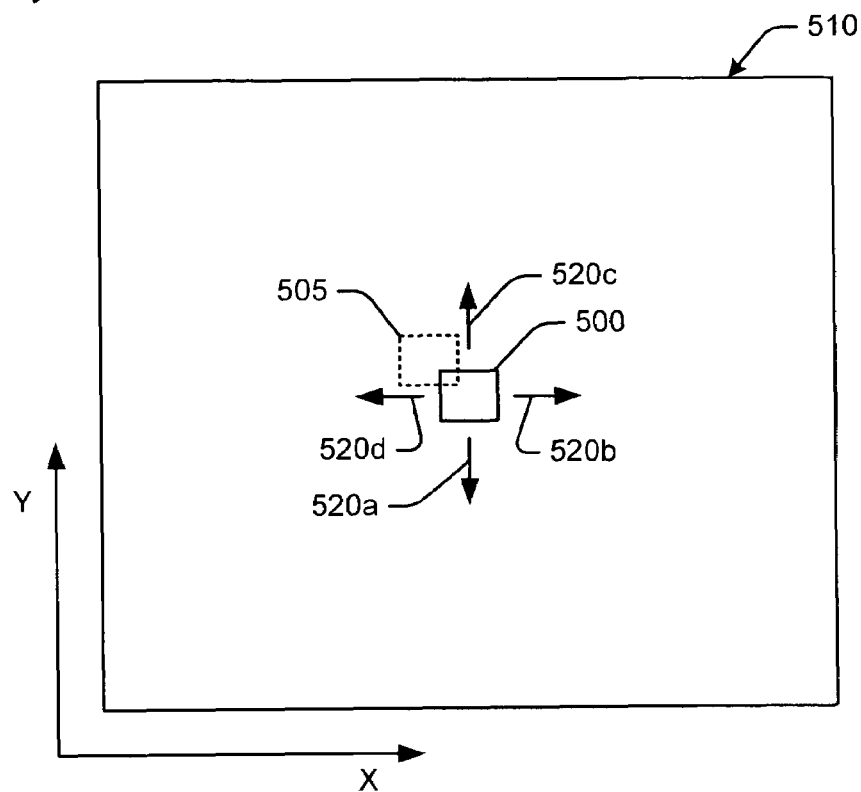
FIGS. 5a and 5b illustrate self-correlation techniques, wherein (a) shows an exemplary reference image, and (b) are exemplary correlation plots.
Figure 5B:
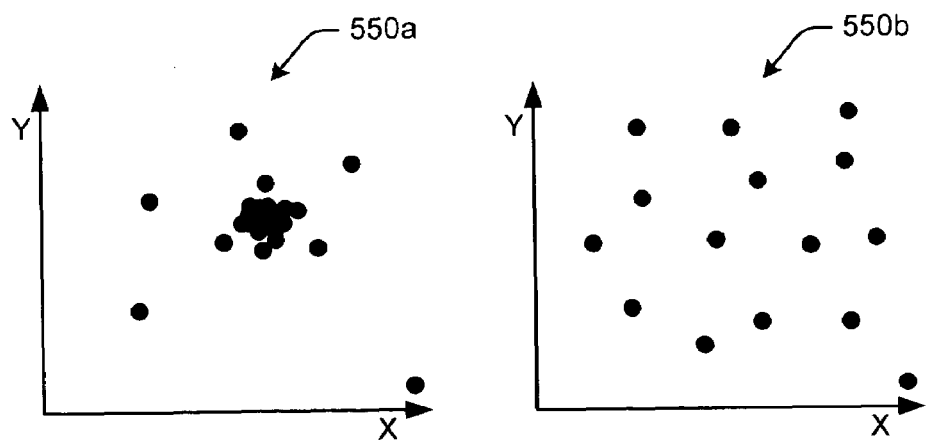

FIGS. 5a and 5b illustrate self-correlation techniques, wherein (a) shows an exemplary reference image 500, and (b) are exemplary correlation plots 550a, 550b. In general, the self-correlation technique includes image registration of a reference image 500 with the surrounding regions in a scene 510 being photographed. Reference images and surrounding regions which include at least some degree of image structure tend to have a poor correlation with the surrounding regions. Alternatively, reference images which include little if any image structure tend to have a very high correlation with the surrounding regions. In an exemplary embodiment, self-correlation techniques may be used to select focus zones. In another exemplary embodiment, self-correlation techniques may be used to qualify focus zones (e.g., to confirm or reject focus zones that have already been selected).

In an exemplary embodiment, reference image 500 may be selected by copying pixel data for a region of the scene 510 being photographed. The reference image 500 may be selected from the scene 510 using any suitable criteria. For example, the reference image 500 may be selected from a predetermined "starting point" if the self-correlation technique is being implemented to select focus zones. Or for example, the reference image 500 may be selected from within a focus zone that has already been identified if the self-correlation technique is being implemented to qualify a focus zone.

The reference image 500 is then moved over adjacent regions to generate difference images 505, e.g., as illustrated by arrows 520a-d. The pixel data for each difference image 505 is generated by subtracting the original image from the pixel data for the reference image 500, yielding at least some difference. This difference may be quantized by summing the absolute values of all pixels in the difference image. The black dots in plot 550a and 550b indicate areas where there the sum of the absolute values of the difference image is low (i.e. high correlation). If this sum is low in a an area adjacent to the original location of the reference image (i.e., there is high correlation) as represented by the black dots in shown in the plot 550a, there is likely to be little image structure near the reference image 500 (and hence it may be a poor target for auto-focus operations). If this sum is high (i.e., there is little correlation) near the original location of the reference image 500 as shown in the plot 550b, there is likely to be a lot of image structure near the reference image (and hence it may be a good target for auto-focus operations).

In an exemplary embodiment, an image structure map may be generated to identify directionality of the image structure. Accordingly, the focus zones may be selected to optimize focus along the direction of the image structure.

Figure 6:
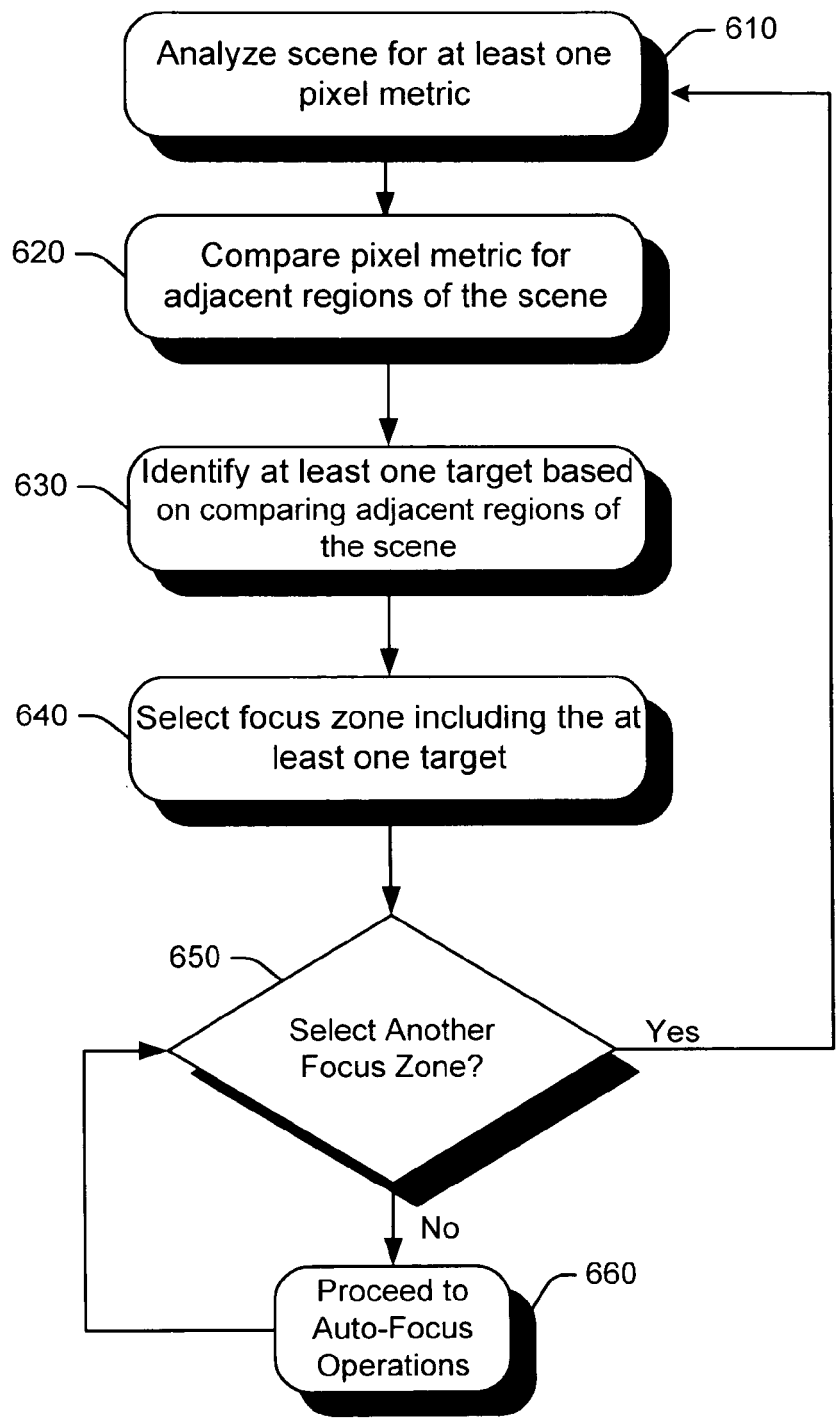
FIG. 6 is a flowchart illustrating exemplary operations which may be implemented for selecting dynamic focus zones for cameras.

FIGS. 6 and 7 are flowcharts illustrating exemplary operations which may be implemented for dynamic focus zones for cameras. The operations 600 and 700 may be embodied as logic instructions on one or more computer-readable medium. When executed by a processor, the logic instructions implement the described operations. In an exemplary implementation, the components and connections depicted in the figures may be used for dynamic focus zones for cameras.

FIG. 6 is a flowchart illustrating exemplary operations which may be implemented for selecting dynamic focus zones for cameras. In operation 610, a scene may be analyzed for at least one pixel metric. For example, pre-image data may be analyzed for brightness, exposure, contrast, etc. In operation 620, the pixel metric may be compared for adjacent regions of the scene. For example, the pixel metric for adjacent grid elements may be compared. In operation 630, at least one target may be identified based on a comparison of adjacent regions of the scene. For example, adjacent regions which exhibit high contrast may include high image structure, and therefore be suitable for use as a target during auto-focus operations. And in operation 640, a focus zone may be selected which includes the at least one target identified in operation 630.

A determination is made in operation 650 whether to select another focus zone. If the determination is made to select another focus zone, operations may return to operation 610. If the determine is made not to select another focus zone, the process may proceed to auto-focus operations at 660.

FIG. 7 is a flowchart illustrating exemplary operations which may be implemented for qualifying dynamic focus zones for cameras. In operation 710, a reference image may be selected from the scene being photographed. For example, pixel data may be gathered for the reference image. In operation 720, the reference image is moved to adjacent regions. For example, pixel data may be gathered for one or more adjacent regions, also referred to as the difference image. In operation 730, the reference image is compared with the difference image. For example, pixel data for the reference image may be subtracted from pixel data for the difference image.

A determination is made in operation 740 whether there is a correlation between the reference image and the difference images. If there is high correlation (e.g., there is not much image structure), the reference image may be rejected as a focus zone. Alternatively, if there is little correlation (e.g., there is image structure) the reference image and nearby regions may be selected as the focus zone.

The operations shown and described with reference to FIGS. 6 and 7 are provided to illustrate exemplary implementations of dynamic focus zones for cameras. It is noted that the operations are not limited to the ordering shown. Still other operations may also be implemented.

It is noted that the exemplary embodiments shown and described are provided for purposes of illustration and are not intended to be limiting. Still other embodiments are also contemplated for dynamic focus zones for cameras.

The invention claimed is:

1. A camera system with enhanced auto-focus operations, comprising:
   an image sensor and pre-image logic operating with the image sensor to generate pre-image data for a scene being photographed;
   processing logic operatively associated with the pre-image logic, the processing logic receiving the pre-image data from the pre-image logic, the processing logic:
      comparing adjacent regions of the scene to identify a plurality of distinct focus zones including at least one high-structure target; and
      qualifying each of the plurality of distinct focus zones prior to auto-focus operations.

2. The camera system of claim 1, wherein the processing logic compares adjacent region for at least one of contrast ratio, brightness, number/frequency of edges, gradient and presence/absence of saturated pixels.

3. The camera system of claim 1, wherein the image sensor is analyzed as a plurality of grid elements to compare adjacent regions of the scene.

4. The camera system of claim 3, wherein the plurality of grid elements each represent individual pixels in the image sensor.

5. The camera system of claim 3, wherein the plurality of grid elements each represent groups of pixels in the image sensor.

6. The camera system of claim 1, further comprising a saturation filter for rejecting saturated regions.

7. The camera system of claim 1, further comprising a saturation filter for rejecting regions without saturated pixels.

8. The camera system of claim 1, further comprising a saturation filter for identifying regions that surround or are adjacent to saturated pixels.

9. The camera system of claim 1, further comprising an exposure filter for rejecting over-exposed regions.

10. The camera system of claim 1, further comprising an exposure filter for rejecting under-exposed regions.

11. A method for enhancing auto-focus operations in a camera, comprising:
    analyzing a scene being photographed for at least one pixel metric;
    comparing the at least one pixel metric for adjacent regions of the scene to identify at least one target in the scene being photographed;
    selecting a plurality of distinct focus zones including the at least one target for auto-focus operations; and
    qualifying each of the plurality of distinct focus zones prior to auto-focus operations.

12. The method of claim 11, wherein qualifying each of the plurality of distinct focus zones includes accepting or rejecting focus zones based on auto-correlation of a reference image with adjacent regions of the scene being photographed.

13. The method of claim 11, further comprising excluding saturated pixels from the plurality of distinct focus zones.

14. The method of claim 11, further comprising excluding pixels from the plurality of distinct focus zones based on a brightness threshold.

15. The method of claim 11, further comprising dynamically sizing at least one of the distinct focus zones based on image structure.

16. The method of claim 11, further comprising generating histogram data for each of the adjacent regions of the scene being photographed, wherein the histogram data is used for comparing the at least one pixel metric for adjacent regions of the scene.

17. A method for enhancing auto-focus operations in a camera, comprising:
    selecting a reference image from a scene being photographed;
    selecting a plurality of difference images from regions adjacent the reference image;
    comparing the reference image and the plurality of difference images; and
    selecting a plurality of focus zones based on correlation of the compared reference image and the plurality of difference images.

18. The method of claim 17, wherein the reference image is in an already selected focus zone.

19. The method of claim 17 wherein selecting the plurality of focus zones qualifies at least one already selected focus zone.

20. The method of claim 17, further comprising computing a mathematical metric between adjacent regions for comparing the reference image and the plurality of difference images.

21. The method of claim 17, further comprising dynamically sizing at least one of the distinct focus zones based on image structure.

22. The method of claim 17, further comprising generating a map of image structure in the scene being photographed before selecting at least one of the plurality of focus zones.

* * * * *